(12) United States Patent
McDonald

(10) Patent No.: US 11,070,703 B2
(45) Date of Patent: Jul. 20, 2021

(54) 3D PRINTER TOUCHSCREEN INTERFACE LOCKOUT

(71) Applicant: Robert Bosch Tool Corporation, Mount Prospect, IL (US)

(72) Inventor: Gwendolyn McDonald, Barrington Hills, IL (US)

(73) Assignees: ROBERT BOSCH TOOL CORPORATION, Mount Prospect, IL (US); ROBERT BOSCH GMBH, Stuttgart (DE)

( * ) Notice: Subject to any disclaimer, the term of this patent is extended or adjusted under 35 U.S.C. 154(b) by 624 days.

(21) Appl. No.: 15/223,679

(22) Filed: Jul. 29, 2016

(65) Prior Publication Data

US 2018/0035011 A1    Feb. 1, 2018

(51) Int. Cl.
| | |
|---|---|
| *G06F 3/12* | (2006.01) |
| *G06F 21/31* | (2013.01) |
| *H04N 1/00* | (2006.01) |
| *H04N 1/44* | (2006.01) |
| *H04L 29/06* | (2006.01) |

(Continued)

(52) U.S. Cl.
CPC ......... *H04N 1/4413* (2013.01); *B29C 64/20* (2017.08); *B33Y 30/00* (2014.12); *G06F 3/1222* (2013.01); *G06F 3/1238* (2013.01); *G06F 3/1286* (2013.01); *G06F 21/31* (2013.01); *G06F 21/316* (2013.01); *H04L 63/083* (2013.01); *H04L 63/0861* (2013.01); *H04N 1/00411* (2013.01); *H04N 1/4433* (2013.01)

(58) Field of Classification Search
CPC ............. H04N 1/4413; H04N 1/00411; H04N 1/4433; G06F 21/31; G06F 21/316; G06F 3/041; G06F 3/0414; G06F 3/044; G06F 3/0487; G06F 2203/04105; G06F 2203/04106
USPC ....................................................... 358/1.14
See application file for complete search history.

(56) References Cited

U.S. PATENT DOCUMENTS 9,354,731 B1 * 5/2016 Pance ..................... G06F 3/044
2008/0301792 A1  12/2008 Hong
(Continued)

OTHER PUBLICATIONS

Federal Electronics Challenge "How to Print a Confidential Document Using a PIN Code", Jun. 26, 2012.
(Continued)

*Primary Examiner* — Juan M Guillermety
(74) *Attorney, Agent, or Firm* — Norton Rose Fulbright US LLP; Gerard Messina

(57) ABSTRACT

A method for authenticating a user of a 3D printer to prevent unauthorized use of the 3D printer includes obtaining a user profile from a set of user profiles, each user profile corresponding to a user and including a stored multi-digit number; prompting the user, by a touch screen interface of the 3D printer, to input a personal identification number (PIN); preventing use of the 3D printer if the PIN does not match the stored multi-digit number; and authenticating the user if the PIN does match the stored multi-digit number. The method includes prompting the user to apply a force to the touch screen interface; detecting an applied force; comparing the applied force to a force threshold value; and preventing use of the 3D printer if the applied force is less than the force threshold value.

6 Claims, 3 Drawing Sheets

(51) Int. Cl.
*B33Y 30/00* (2015.01)
*B29C 64/20* (2017.01)

(56) References Cited

U.S. PATENT DOCUMENTS

| | | | | |
|---|---|---|---|---|
| 2012/0126941 A1* | 5/2012 | Coggill | ............... | G06F 21/36 |
| | | | | 340/5.54 |
| 2015/0264572 A1* | 9/2015 | Turgeman | ............... | G06F 3/041 |
| | | | | 455/411 |
| 2015/0301684 A1* | 10/2015 | Shimamura | ........... | G06F 3/0414 |
| | | | | 345/174 |
| 2015/0324018 A1* | 11/2015 | Hinson | ............... | G06F 3/044 |
| | | | | 345/179 |
| 2016/0299628 A1* | 10/2016 | Ribeiro | ............... | G06F 3/0414 |
| 2016/0328065 A1* | 11/2016 | Johnson | ............... | G06F 3/0488 |
| 2017/0023929 A1* | 1/2017 | Matsuda | ............ | G05B 19/4099 |
| 2017/0249048 A1* | 8/2017 | Hill | ............... | G06F 3/04886 |

OTHER PUBLICATIONS

Anonymous: "Security question—Wikipedia", Apr. 22, 2016.
Dremel: "Dremel 3D Idea Builder 3D20 Quick Start Guide", Oct. 31, 2014, p. 3.
International Search Report for PCT/EP2017/068582, dated Nov. 2, 2017.

\* cited by examiner

3D PRINTER TOUCHSCREEN INTERFACE LOCKOUT

FIELD OF THE INVENTION

The present invention relates generally to authenticating a user of a 3D printer, and more specifically, to preventing unauthorized use of a 3D printer.

BACKGROUND 3D printing, or additive manufacturing, is a process of making three dimensional solid objects based on blueprints provided by digital files. The synthesis of the desired 3D solid object is achieved by strategically generating successive layers of an additive material in a pattern on a platform of a 3D printer until the entire object is created. The synthesis of the 3D object is driven by the digital files that provide the specifications that describe how to create the pattern of layers and the materials used to generate the object. The digital files specifying the design are provided by the user, and examples of the digital files read by the 3D printer include G-code files, computer-aided design ("CAD") files, STereoLithography ("STL") CAD files, and other file types generally used in additive manufacturing processes. In some instances, the digital files refer to a 3D model of a new object, but alternatively, the digital files can refer to a copy of an object derived from the usage of a 3D scanner.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3D printer to generate the 3D object can include, for example, any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil.

3D printers are generally protected from external influences by a build cage, and, within the build cage, the 3-D printer typically includes the following: (1) at least one extruder, (2) a guide rail system, (3) a build platform, (4) at least one filament spool, (5) and at least one motor for maneuvering the at least one extruder. In addition, the extruder can include a cooling system to regulate the temperature of the extruder.

Typically, during the operation of an FFF 3D printer, a plastic filament is unwound from a filament spool and supplied to an extruder. The extruder applies heat at a specific temperature to the filament, which melts the plastic filament to start material flow. Once the plastic filament has begun to flow, the motor for maneuvering the extruder uses the guide rail system to position (both horizontally and vertically) the extruder relative to the build platform to apply a first layer of the 3D object to the build platform. Due to the characteristics of the filament and the cooling system of the extruder, the filament cools shortly after it has been extruded. Once the first layer has been applied, the extruder is repositioned, and a second layer is applied on the surface of the first layer. This process is repeated until the 3D object is fully constructed.

Some 3D printers include a touch screen interface, which allows users to easily interact with the 3D printer. The touch screen interface typically includes a touch sensor panel, which may be a clear panel with a touch-sensitive surface, a display device that can be positioned behind the panel so that the touch-sensitive surface substantially covers the viewable area of the display device, and a computer processor to interpret signals from the touch-sensitive surface. The touch screen interface allow a user to provide various types of input to the 3D printer by touching the touch sensor panel using a finger, stylus, or other object at a location dictated by a user interface being displayed by a display device. This interaction can include, for example, inputting commands, adjusting settings, viewing information, etc.

In general, the touch screen interface can recognize a touch event (i.e., user interaction) and the position of the touch event on the touch sensor panel, can then interpret the touch event in accordance with the display appearing at the time of the touch event, and thereafter can perform one or more actions based on the touch event.

SUMMARY

Example embodiments of the present invention provide methods and systems to prevent unauthorized use of a 3D printer and to verify that an adult is operating the 3D printer.

3D printing requires precision during the printing process, since each layer must be precisely positioned relative to other, e.g., previously printed, layers. Therefore, it is desirable to prevent a user from interfering with the 3D printer during the printing process. Specifically, it is important that no external forces interfere with the motor, guiderail system, extruder, or the build platform as a 3D objected is printed.

Furthermore, it is advantageous to protect a user from dangerous conditions that occur during the printing process, since the operating temperature of the extruder can reach upwards of 397° F., which can cause serious injury to the user. Therefore, it is desirable for a 3D printer to prevent a user from inadvertently contacting the motor, guiderail system, extruder, or the build platform during the printing process.

Furthermore, operating a 3D printer requires adult supervision. Therefore, it is desirable for a 3D printer to have the capabilities to prevent an unsupervised child from operating the 3D printer. In particular, it is desirable for a 3D printer to be capable of differentiating between a child user and an adult user.

According to an example embodiment of the present invention, a method for authenticating a user of a 3D printer to prevent unauthorized use of the 3D printer includes, responsive to user manipulation of a touch screen interface for operating the 3D printer, obtaining a user profile from a set of user profiles, each user profile corresponding to a respective user and including a stored multi-digit number; prompting the user, by the touch screen interface of the 3D printer, to input a personal identification number (PIN); preventing use of the 3D printer if the PIN does not match the stored multi-digit number; and proceeding with an authentication procedure for authenticating the user if the PIN does match the stored multi-digit number.

In an example embodiment, the user profile includes at least one of contact information of the user and an answer to at least one verification question. In an example embodiment, if the PIN does not match the stored multi-digit number, the method includes notifying the user of the incorrectly input PIN, using the contact information; and updating the user profile with an updated stored multi-digit number. Additionally, if the PIN matches the stored multi-digit number, in an example embodiment, the method proceeds with the authentication procedure, which, in an example embodiment, includes prompting the user to input a response to the at least one verification question, where, if the response matches the stored answer to the at least one verification question, the user is authenticated and a processor allows the user to operate the 3D printer, but, if the response does not match the stored answer to the at least one verification question, the method locks the user out from using the 3D printer.

In an example embodiment, in the case of the lockout of the user from using the 3D printer due to entry of an incorrect answer to the security question, the processor uses the stored contact information, e.g., e-mail address, e.g., by transmitting an e-mail to the stored e-mail address, to notify the user that there has been an incident in which the 3D printer was attempted to be used with entry of an incorrect answer to the stored security question, that the previously stored PIN has been disabled, and that a temporary PIN has been assigned (and stored in the user profile). The user can then access an interface, e.g., via a computer terminal, to modify the user profile, e.g., by setting a new PIN, setting a new security question, and/or setting a new answer to the security question. In an example embodiment, in the case of the lockout of the user from using the 3D printer due to entry of an incorrect answer to the security question, the processor also displays on the touch screen interface a message noting that the user has been locked out from use of the 3D printer and/or that a new PIN has been reassigned. In an example embodiment, that a new PIN has been reassigned is displayed on the touchscreen without display of the new PIN, so that user access to the new PIN is via the contact medium of the stored contact information. The authentication procedure even following correct input of the PIN is particularly advantageous because it can occur that a person with a relationship to the user to whom the PIN is assigned, e.g., a child, obtains access to the user's PIN, e.g., based on intimate knowledge of the user's life, characteristics, etc., but despite the relationship should not operate the printer due to safety reasons, e.g., a minor child. The authentication procedure can function as a precaution to lockout such a person, e.g., the minor child, and provide the user with an opportunity to reset the PIN to one unknown to the unauthorized person.

In an example embodiment, the method includes detecting, by the touch screen interface, a force applied to the touch screen interface to operate the 3D printer; comparing the applied force to a force threshold value; and preventing use of the 3D printer if the applied force is less than the force threshold value. Furthermore, the method includes detecting, by the touch screen interface, a number of inputs used to apply the applied force; preventing use of the 3D printer if the number of inputs used to apply the applied force is greater than one, where the respectively applied forces of each of the individual inputs not meeting the force threshold value; and authenticating the user as an adult if 1) the applied force is greater than or equal to the force threshold value and 2) the number of inputs used to apply the applied force is equal to one. For example, the force threshold value corresponds to an average force that an adult user can apply using a single input. In another example, the force threshold value corresponds to a value greater than an average force that a child can apply using a single input. The authentication procedure is particularly advantageous because it prevents a child, for whom it is unsafe to operate the 3D printer, from using the 3D printer, for example, even if authenticating a particular user is not required for using the 3D printer.

According to an example embodiment, the touch screen interface includes one or more pressure sensors (i.e., force sensors), configured to detect a force signal corresponding to an object exerting a force on the surface of the touch screen. In this manner, the touch screen interface can determine whether the touch event is creating a large force or a small force. For example, in an example embodiment, the touch screen interface includes a plurality of force sensors arranged behind the touch sensor panel, with each sensor providing an electric signal based on the deflection of the touch sensor panel when a touch event occurs.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

DETAILED DESCRIPTION

Figure 1:
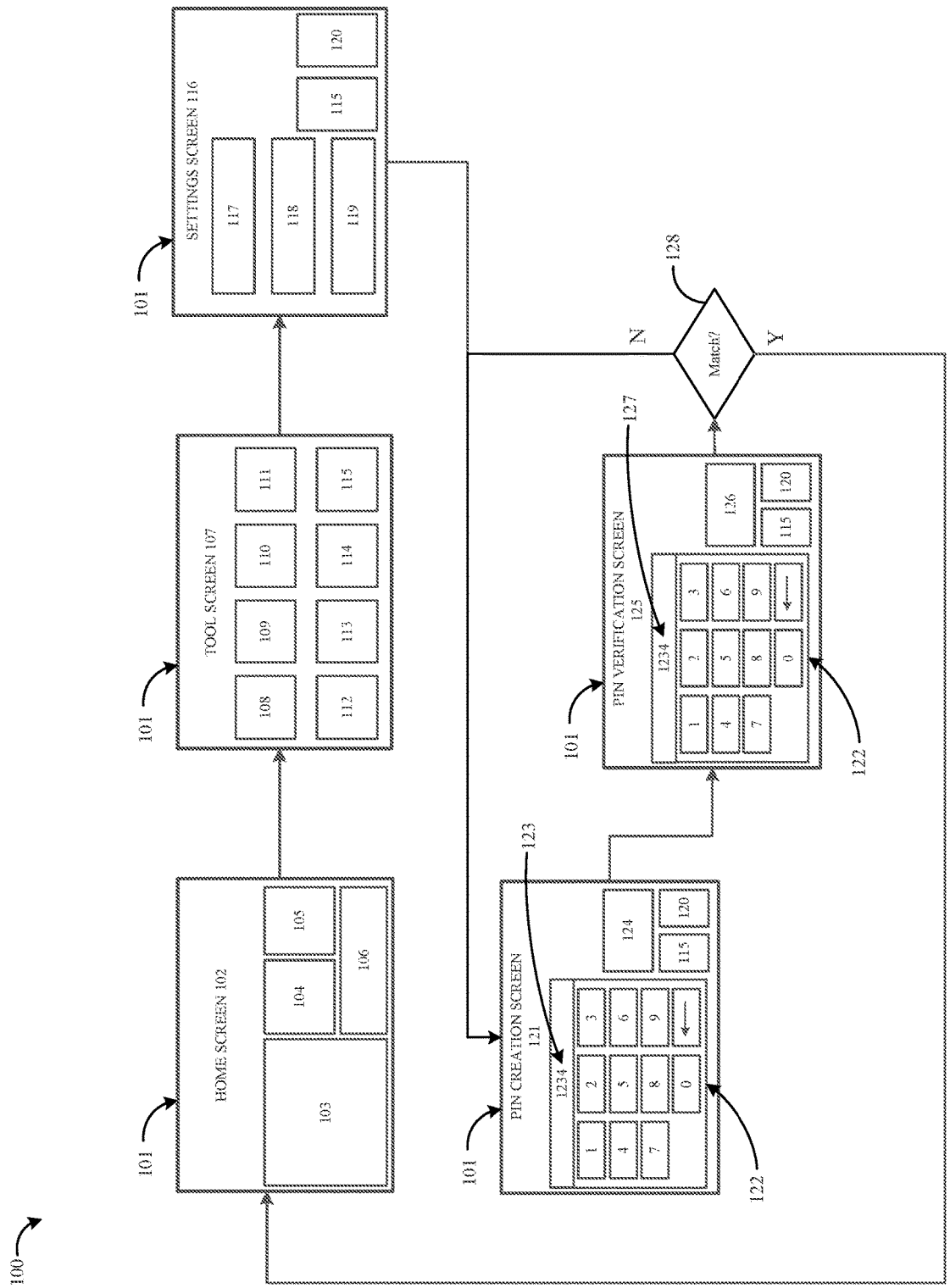
FIG. 1 is a diagram corresponding to a method of generating a PIN according to an example embodiment of the present invention.

FIG. 1 shows a PIN generation method 100 for generating a PIN using a touch screen interface 101 of a 3D printer. In an example embodiment, touch screen interface 101 operates under control of a processor and a non-transitory storage medium on which are stored program instructions that are executable by the processor, and that, when executed by the processor, cause the process to perform methods of operating the touch screen interface 101, such as the example methods depicted in and described below with respect to FIGS. 1-4.

In an example embodiment, touch screen interface 101 includes pressure sensors, which are configured to detect a force signal corresponding to a force exerted by an object on the surface of the touch screen interface 101.

In an example embodiment, PIN Generation method 100 includes displaying, by touch screen interface 101, Home Screen 102, which includes, for example, user selectable options 103, 104, 105, and 106. Options 103, 104, 105, and 106 include, for example, a "Build" option, a "Filament" option, a "Level" option, and a "Tool" option. Option 106 can, for example, correspond to the "Tool" option, in response to selection of which touch screen interface 101 displays Tool Screen 107.

Tool Screen 107 includes, for example, user selectable options 108, 109, 110, 111, 112, 113, 114, and 115. Options 108, 109, 110, 111, 112, 113, 114, and 115 include, for example, a "Service" option, a "Wi-Fi" option, a "Calibrate" option, a "Jog Mode" option, a "Settings" option, a "Preheat" option, an "About" option, and a "Back" option. For example, option 112 can correspond to the "Settings" option, and option 115 can correspond to the "Back" option, in response to selection of which touch screen interface 101 displays Home Screen 102. If a user selects "Settings" option 112, touch screen interface 101 displays Settings Screen 116.

Settings Screen 116 includes, for example, user selectable options 117, 118, 119, 115, and 120, where option 115 corresponds to "Back" option in response to selection of which Tool Screen 107 is displayed. Options 117, 118, 119, and 120 can include, for example, a "Set Pin Code" option, a "Lock After _____ Minutes" option, a "Renew Token" option, and a "Home" option. For example, option 117 can correspond to the "Set Pin Code" option, and option 120 can correspond to the "Home" option, in response to selection of the latter of which touch screen interface 101 displays Home Screen 102. In an example embodiment, if a user selects "Set Pin Code" option 117, touch screen interface 101 displays Pin Creation Screen 121 via which a user can set a PIN to, going forward, require entry thereof for use of the 3D printer.

In an example embodiment, Pin Creation Screen 121 includes, for example, numeric keypad 122, which allows a user to generate PIN 123. PIN 123 can be, for example, a multi-digit number. Alternative example embodiments support an alpha-numeric PIN. Pin Creation Screen 121 also includes, for example, "Back" option 115 (for re-display of Settings Screen 116) and "Home" option 120 (for redisplay of Home Screen 102). Pin creation Screen 121 also includes, for example, "Enter" option 124, which allows a user to set the theretofore entered number as the selected PIN 123. In an example embodiment, once a user has entered PIN 123, touch screen interface 101 displays, for example, Pin Verification Screen 125.

In an example embodiment, Pin Verification Screen 125 includes a numeric keypad 122, "Back" option 115 for redisplay of PIN Creation Screen 121, "Home" Option 120 for redisplay of Home Screen 102, and option 126, which is, for example, a "Done" option. Pin Verification Screen 125, for example, prompts a user to, using numeric keypad 122, enter PIN 127 that had previously been set in PIN Creation Screen 121. Once the user has entered PIN 127 and selected "Done" option 126, touch screen interface 101 verifies whether PIN 127 matches PIN 123 at step 128. If PIN 127 matches PIN 123, touch screen interface 101 confirms that a user has properly entered PIN 123 and, for example, redisplays Home Screen 102, e.g., with a notification of success of setting the PIN. On the other hand, if the compared PINs do not match, the method redisplays PIN Creation Screen 121 to a new entry of PIN 123.

Figure 2:
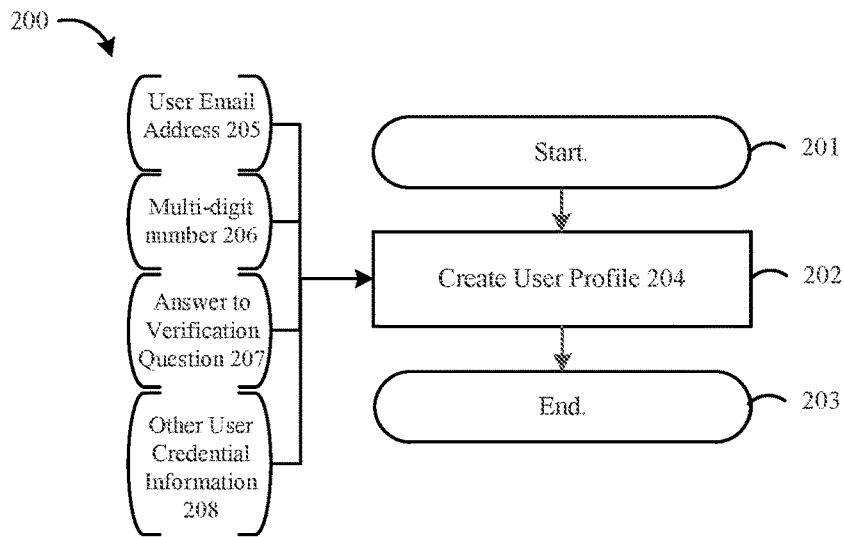
FIG. 2 is a flowchart depicting a method of creating a user profile according to an example embodiment of the present invention.

FIG. 2 is a flowchart that illustrates a method 200 for creating a User Profile 204 using touch screen interface 101 of a 3D printer, according to an example embodiment of the present invention. Method 200 beings at step 201.

At step 202, touch screen interface 101 prompts a user to input information of User Profile 204, e.g., user's email address 205, multi-digit number 206, answer to a verification question 207, and other user credential information 207. For example, upon first use of the printer, the touch screen interface 101 can prompt the creation of the profile, including setting of access information by which to limit future use of the printer to a particular user. In an example embodiment, the system permits use of an administrator profile by which to set multiple user profiles, each with respective access credentials. According to alternative example embodiments, one or more of these informational elements can be entered by separate input methods instead of or in addition to by way of this illustrated flow. For example, a method for generating a multi-digit number as a PIN has been described with respect to FIG. 1. In an example embodiment, a modified version of the method described with respect to FIG. 1 can be used for the flow described with respect to FIG. 2, whereby screen 121 is a user profile generation screen, by which the PIN can be generated in addition to other user profile information. Other user credential information 207 may include, for example, the user's telephone number, birthdate, etc. Once the user has entered all required information for the creation of User Profile 204, method 200 ends at step 203. In an alternative example embodiment, the PIN and/or other user profile information can be set remotely at a user terminal that is communicatively coupled to the 3D printer that includes its touch screen interface 101. For example, the communicatively coupled terminals are assigned to respective users who have been given permission to use the 3D printer.

Figure 3:
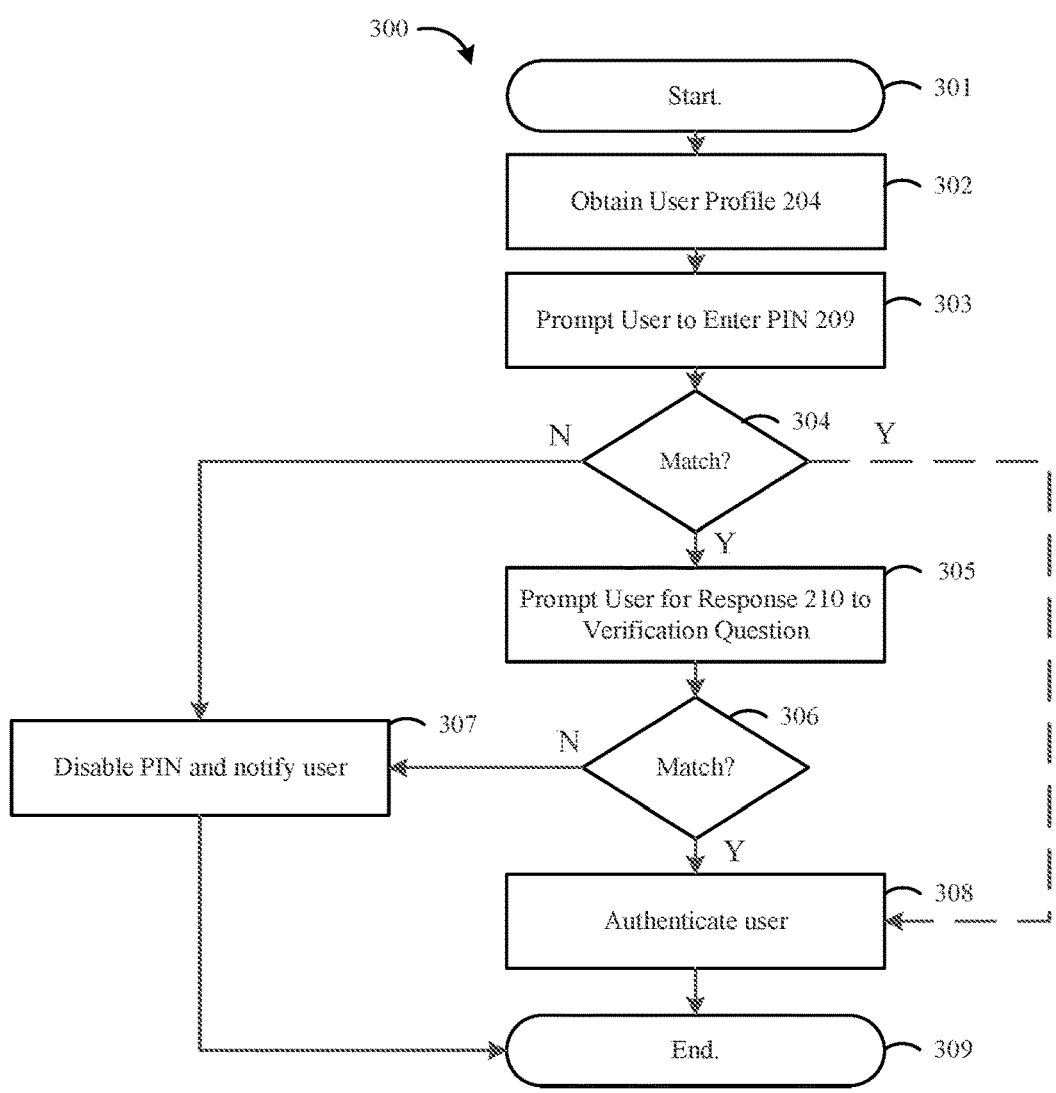
FIG. 3 is a flowchart depicting a method of authenticating a user according to an example embodiment of the present invention.

FIG. 3 is a flowchart for a user authentication method 300 using a touch screen interface 101 of a 3D printer, according to an example embodiment of the present invention. The method beings at step 301.

At step 302, e.g., in response to a user input to begin operation of the 3D printer, touch screen interface 101 obtains one or more User Profile(s) 204. At step 303, touch screen interface 101 prompts a user to enter PIN 209. At step 304, authentication method 300 determines if PIN 209 matches multi-digit number 206. If PIN 209 does not match multi-digit number 206, authentication method 300 proceeds to step 307. At step 307, authentication method 300 disables multi-digit number 206 and notifies the user associated with User Profile 204, for example, by using user email address 205. After multi-digit number 206 has been disabled, authentication method 300 prompts the user to enter an updated multi-digit number with which the User Profile 204 had been automatically updated and which had been indicated in the notification sent at step 307 or to enter an updated multi-digit number with which USER Profile 204 had been manually updated, e.g., in response to the notification sent 307. For example, according to an example embodiment, the notification is an e-mail that includes a link in response to selection of which an interface is displayed, e.g., on a screen of a remote terminal, e.g., at which the e-mail is displayed, which interface includes input fields for updating the multi-digit number 206 of User Profile 204.

If PIN 209 matches multi-digit number 206, then authentication method 300 proceeds to step 305 at which touch screen interface 101 prompts the user to provide response 210 to one or more of the at least one verification question. If response 210 does not match the stored answer to verification question 207, authentication method 300 proceeds to step 307, which disables multi-digit number 206 and notifies the user of the disablement.

If response 210 matches answer to verification question 207, authentication method 300 proceeds to step 308, which authenticates the user as being permitted to operate the 3D printer. Method 300 ends at step 308.

In an alternative example embodiment, if, at step 304, PIN 209 matches multi-digit number 206, authentication method 300 proceeds to step 308 without asking the user to input response 210 to a verification question.

Figure 4:
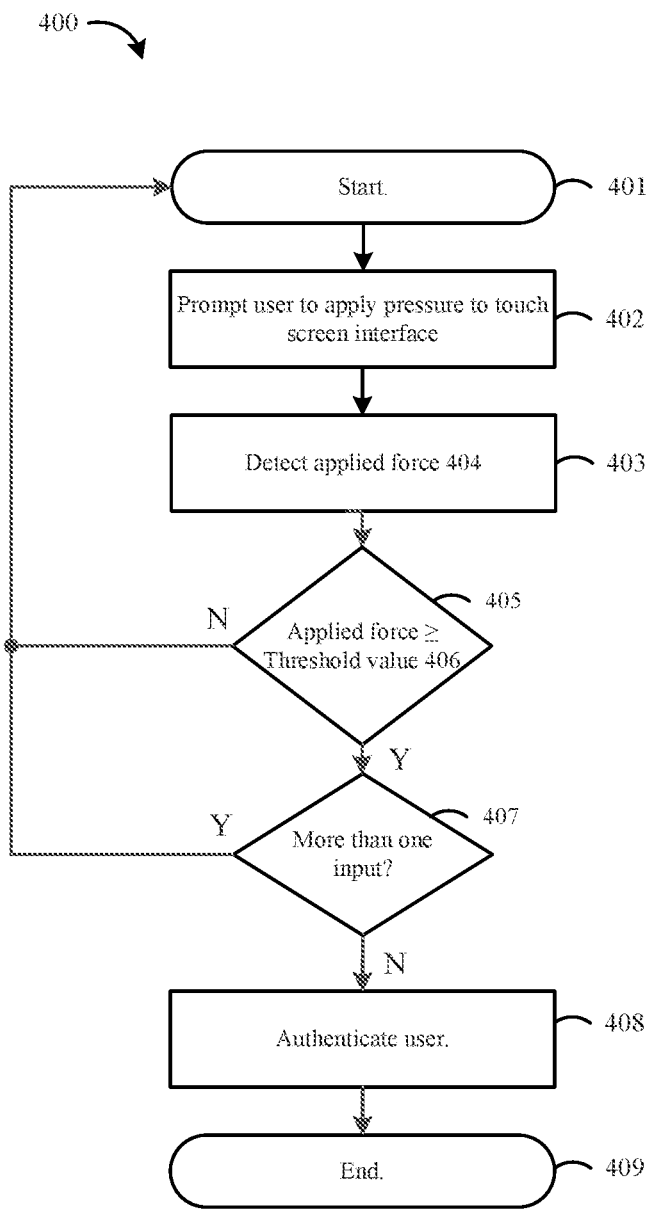
FIG. 4 is a flowchart depicting a method of authenticating a user according to an example embodiment of the present invention.

FIG. 4 is a flowchart that illustrates a user authentication method 400 for preventing use of a 3D printer by a minor, using touch screen interface 101 of a 3D printer, according to an example embodiment of the present invention, which authentication method can be used in combination with requiring entry of a PIN code or even where operation of the 3D printer is not limited to only specifically identified persons by way of PIN or other identification methods. User authentication method 400 begins at step 401.

At step 402, authentication method 400 prompts a user to apply pressure to touch screen interface 101. At step 403, authentication method 400 detects applied force 404 applied by the user. Alternatively, instead of a dedicated prompt for application of pressure and subsequent detection of pressure applied in response to the prompt, pressure applied by a user when selecting an option, via touch screen interface 101, requesting operation of the 3D printer, is detected, the user-selection of the option beginning the authentication method 400 with step 403. Next, at step 405, authentication method 400 determines if applied force 404 is greater than or equal to force threshold value 406. For example, in an example embodiment, force threshold value 406 is set to a force that an average adult can exert on touch screen interface 101 with one input, e.g., with a press of a single finger. Therefore, if applied force 405 is less than force threshold value 406, authentication method 400 determines that an adult is not applying pressure to the touch screen interface 101, and authentication method 400 returns to step 401.

If applied force 405 is greater than or equal to force threshold value 406, then authentication method 400 proceeds to step 407. At step 407, authentication method 400 determines if the user is using more than one input to apply applied force 404. If more than one input is used to apply applied force 404, then authentication method 400 determines that the user is not authenticated as an adult. In an example embodiment, where more than one pressure point is detected, the sensor detects whether pressure at any single one of the pressure points meets the threshold, in which case the user is authenticated but is otherwise not authenticated. The authentication method then returns to step 401.

If force 404 is sensed as having been applied by a single input, e.g., a single finger, then, at step 408, authentication method 400 authenticates the user who has applied force 404 as an adult. Authentication method 400 ends at step 409.

In an example embodiment, the sensor for detecting the force includes a capacitor arrangement, where an external layer of the touch screen interface 101 is flexible and can be bent downward towards an underlying layer, where the distance between the external and underlying layers varies depending on the amount of pressure applied, which distance can be detected based on a change in capacitance in response to a change in distance between electrodes integrated in the external and underlying layers, respectively. A plurality of electrode pairs can be arranged, e.g., in a grid, so that a pattern of distance values are detectable by which to ascertain the number of pressure points used to apply pressure. For example, a single pressure point is expected to match to a stored gradient of pressure over an applied area, e.g., with greatest pressure at the center of an applied pressure and gradually lower pressure in a direction that extends radially outward from the center. If a pressure pattern includes a center of greatest pressure, followed by gradually lower pressure, and then continuing further away from the initial center with a gradual increase in pressure to another center point of high pressure, such a pattern indicates presence of two pressure points.

In an example embodiment, the external layer of the touch screen interface 101 can be formed of a glass or a flexible shape conforming polymer.

An example embodiment of the present invention is directed to processing circuitry, e.g., including one or more processors, which may be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for authenticating a user of a 3D printer to prevent unsafe use of the 3D printer, the method comprising:
   detecting, by a sensor, a respective pressure applied simultaneously to each of a plurality of pressure points of a detection surface of a touchscreen interface of the 3D printer, wherein the detected simultaneously applied pressures in combination form a force on the touchscreen interface and wherein the plurality of pressure points correspond to a plurality of input locations;
   determining, by processing circuitry, that the force on the touchscreen interface satisfies a force threshold value;
   determining, by the processing circuitry, that the application to the touchscreen interface of the force satisfying the force threshold value was performed by the simultaneous application of respective pressure using at least a threshold number of the plurality of input locations; and preventing, by the processing circuitry, operation of the 3D printer for extruding a print material as a result of the determination of the number of used input locations, wherein operation of the 3D printer is conditioned upon the force satisfying the force threshold value being applied to the touchscreen interface by application of pressure using less than the threshold number of the plurality of input locations.

2. The method of claim 1, further comprising the processing circuitry determining that the force greater than the force threshold value is applied using a single one of the input locations and responsively authenticating a user of the 3D printer as an adult.

3. A 3D printer system comprising:
an extruder configured to extrude printing material in layers according to a defined pattern;
processing circuitry, wherein the extruder is configured to operate under control of the processing circuitry;
a touchscreen via which user commands are inputtable according to which commands the processing circuitry is configured to control the extruder; and
a sensor;
wherein:
the sensor is configured to detect a respective pressure applied simultaneously to each of a plurality of pressure points of a detection surface of the touchscreen;
the plurality of pressure points correspond to a plurality of input locations;
the processing circuitry is configured to:
determine that a force applied to the touchscreen by the detected simultaneously applied respective pressures satisfies a force threshold value;
determine that the application to the touchscreen interface of the force satisfying the force threshold value was performed by the simultaneous application of respective pressure using at least a threshold number of the plurality of locations; and
prevent an operation, under a user command input via the touchscreen, for controlling the extruder to extrude the printing material in response to the determination of the number of used input locations; and
the operation is conditioned upon the force satisfying the force threshold value being applied to the touchscreen by application of pressure using less than the threshold number of the plurality of input locations.

4. The system of claim 3, wherein the touchscreen includes an exterior layer that is deformable under pressure applied thereto by a user.

5. The system of claim 4, wherein the sensor includes a first electrode on the exterior layer and a second electrode at an underlying layer, the sensor being configured to detect changes in capacitance between the first and second electrodes, different capacitance values being associated with different pressure values.

6. The system of claim 3, wherein the processing circuitry is configured to authenticate a user of the 3D printer as an adult by detected that the force greater than the force threshold value is applied using a single one of the input locations.

* * * * *